United States Patent

Moriwake

(10) Patent No.: US 8,896,669 B2
(45) Date of Patent: Nov. 25, 2014

(54) IMAGE ADJUSTMENT

(75) Inventor: Katsuakira Moriwake, Tokyo (JP)

(73) Assignee: Sony Corporation, Tokyo (JP)

( * ) Notice: Subject to any disclaimer, the term of this patent is extended or adjusted under 35 U.S.C. 154(b) by 753 days.

(21) Appl. No.: 13/209,905

(22) Filed: Aug. 15, 2011

(65) Prior Publication Data

US 2012/0050492 A1 Mar. 1, 2012

(30) Foreign Application Priority Data

Aug. 31, 2010 (GB) .................................. 1014409.5

(51) Int. Cl.
 *H04N 13/02* (2006.01)
 *H04N 9/69* (2006.01)
 *H04N 13/00* (2006.01)
 *G03B 35/08* (2006.01)

(52) U.S. Cl.
 CPC ............. *H04N 9/69* (2013.01); *H04N 13/0037* (2013.01); *H04N 2013/0077* (2013.01); *G03B 35/08* (2013.01); *H04N 13/0025* (2013.01); *H04N 13/0239* (2013.01); *H04N 13/0296* (2013.01)
 USPC ....................... 348/47; 348/E13.074; 348/650

(58) Field of Classification Search
 CPC ..... G03B 35/08; H04N 9/69; H04N 13/0296; H04N 13/0239; H04N 13/0025; H04N 13/0037; H04N 2013/0077
 USPC ....................................................... 348/42–60
 See application file for complete search history.

(56) References Cited

U.S. PATENT DOCUMENTS

| 8,040,387 | B2* | 10/2011 | Kuniba ...................... 348/222.1 |
| 2003/0076407 | A1* | 4/2003 | Uchiyama et al. .............. 348/46 |
| 2004/0125106 | A1 | 7/2004 | Chen |
| 2005/0243205 | A1* | 11/2005 | Wredenhagen et al. ....... 348/448 |
| 2006/0268152 | A1* | 11/2006 | Uchiyama et al. ............. 348/362 |
| 2008/0024596 | A1* | 1/2008 | Li et al. ............................ 348/47 |
| 2009/0015689 | A1 | 1/2009 | Murayama |

(Continued)

FOREIGN PATENT DOCUMENTS

| CN | 1788486 A | 6/2006 |
| CN | 101038734 A | 9/2007 |
| EP | 2089852 A1 | 8/2009 |
| WO | WO 2008/063167 A1 | 5/2008 |

OTHER PUBLICATIONS

United Kingdom Search Report issued Dec. 15, 2010, in Great Britain Patent Application No. 1014409.5, filed Aug. 31, 2010.
U.S. Appl. No. 13/441,424, filed Apr. 6, 2012, Moriwake.

(Continued)

*Primary Examiner* — Gelek W Topgyal
(74) *Attorney, Agent, or Firm* — Oblon, Spivak, McClelland, Maier & Neustadt, L.L.P.

(57) ABSTRACT

An image adjustment apparatus for processing images output by two image capturing devices arranged with respect to one another so as to capture images representing different respective views of a scene comprises a noise combiner for combining a noise signal with one or both of a pair of corresponding images captured by the two image capturing devices; a difference detector for detecting differences in color properties between the pair of corresponding images output by the noise combiner; and a color property adjuster for adjusting color properties of images from at least one of the image capturing devices on the basis of the differences detected by the difference detector, so as to reduce the differences in color properties between corresponding images captured by the two image capturing devices.

18 Claims, 4 Drawing Sheets

(56) References Cited

U.S. PATENT DOCUMENTS

| | | | |
|---|---|---|---|
| 2009/0046166 A1* | 2/2009 | Kuniba | 348/222.1 |
| 2009/0153745 A1 | 6/2009 | Park et al. | |
| 2010/0066811 A1* | 3/2010 | Chang et al. | 348/43 |
| 2010/0149372 A1* | 6/2010 | Silverstein | 348/223.1 |
| 2011/0292451 A1* | 12/2011 | Harvill | 358/3.03 |
| 2013/0300901 A1* | 11/2013 | Hirai | 348/242 |
| 2014/0036040 A1* | 2/2014 | Takane | 348/47 |

OTHER PUBLICATIONS

Office Action issued Jul. 2, 2014 in Chinese Patent Application No. 2011102596627 (in English).

\* cited by examiner

IMAGE ADJUSTMENT

BACKGROUND OF THE INVENTION

1. Field of the Invention

This invention relates to image adjustment.

2. Description of the Prior Art

Three dimensional (3D) television has recently been made available to the consumer, and it is expected that the amount of 3D equipment and programming will increase rapidly in the next few years.

3D television relies on a stereoscopic technique whereby pairs of images are captured by respective cameras which are displaced laterally (that is to say, substantially in a horizontal image direction) by a certain distance, for example a typical spacing of a user's eyes. The pairs of images therefore represent slightly different views of the same scene; in general they will encompass the same items within the scene (except perhaps at the image extremities) but the relative positions of the items between the two images will depend on the distance of the items from the camera arrangement.

When the images are displayed, it is important that each of the user's eyes sees (at least mainly) a respective one of the image pair. In practice this is achieved in various ways, such as by the user wearing polarising, time multiplexing or color-filtering spectacles, or by the television screen itself being provided with a special lens arrangement which diverts each of the two images to a respective eye position of the viewer. Of these, the color-filtering technique, common in early attempts at 3D cinema, is not generally used in 3D television technology.

Returning to the 3D camera system, each of the pair of images is captured by an independent camera, with its own lens and image capture arrangement (for example a CCD arrangement). But in order to maintain the 3D illusion for the viewer, it is important that the two images of each image pair are closely matched in terms of their color and related properties. Various color parameters are available to the operator of a professional video camera or an external color correction unit, such as the gamma, knee, white level and black level parameters, but the task of setting up a 3D camera arrangement is significantly more difficult than that of setting up a conventional (single) video camera because of the need not only to set the parameters correctly for the current scene, but also to set the parameters so that the two cameras forming the 3D camera arrangement generate images with identical (or very nearly identical) image properties. In the case of a domestic video camera, the range of adjustments available to the user is much more limited, making it even more difficult to set the two cameras to provide identical color properties.

It is an object of the invention to provide an improved capture and/or processing of 3D images.

SUMMARY OF THE INVENTION

This invention provides an image adjustment apparatus for processing images output by two image capturing devices arranged with respect to one another so as to capture images representing different respective views of a scene; the image adjustment apparatus comprising:

a noise combiner for combining a noise signal with one or both of a pair of corresponding images captured by the two image capturing devices;

a difference detector for detecting differences in color properties between the pair of corresponding images output by the noise combiner; and a color property adjuster for adjusting color properties of images from at least one of the image capturing devices on the basis of the differences detected by the difference detector, so as to reduce the differences in color properties between corresponding images captured by the two image capturing devices.

This invention also provides a method of processing images output by two image capturing devices arranged with respect to one another so as to capture images representing different respective views of a scene; the method comprising the steps of:

combining a noise signal with one or both of a pair of corresponding images captured by the two image capturing devices;

detecting differences in color properties between the pair of images output by the combining step; and adjusting color properties of images from at least one of the image capturing devices on the basis of the differences detected by the detecting step, so as to reduce the differences in color properties between corresponding images captured by the two image capturing devices.

The invention also provides computer software for carrying out such a method, and a computer program product including such software.

The invention recognises that even though the images captured by the two cameras of a 3D camera arrangement will (deliberately) be slightly different, because the images represent substantially the same scene their color properties can be assumed to be substantially the same. The invention makes use of this recognition by providing an automatic detection of differences in color properties between corresponding images (for example corresponding left-right pairs of simultaneously-captured images) and adjusting the color properties of at least one of the images so as to reduce such a difference.

In embodiments of the invention, the difference detector comprises a color property detector arranged to detect color properties of images captured by each of the image capturing devices, and the color properties detected by the color property detector represent the distribution of pixel brightness in each of a set of primary pixel colors. In this way, an automated statistical analysis of the pixel color values can be used to detect differences in color properties between the two images.

In embodiments of the invention, the color properties detected by the color property detector comprise, for each of the set of primary or component pixel colors, a histogram of pixel brightness in that color with respect to a set of brightness intervals or bins. In order to reduce the quantity of data that needs to be handled and compared, in embodiments of the invention at least some of the intervals encompass more than one possible pixel brightness value.

The histogram or similar data can in fact vary between images that, to the viewer, would look subjectively the same. This is because the generation of the histograms can place pixels with almost identical color values into different histogram intervals, just because the color values fall either side of the boundary between two such intervals. In order to reduce such effects, the invention provides a noise combiner for combining a noise signal with images to be provided to the difference detector. In this way, random, pseudo-random or other noise is added to the pixel data before the histogram analysis takes place, which can have the effect of distributing pixels, which are closely spaced either side of a histogram interval boundary, more evenly into histogram intervals either side of the boundary.

Another potential feature to reduce this problem is that embodiments of the invention can provide a low pass filter for smoothing the histograms generated in respect of the pair of images prior to the detection of differences between the histograms, thereby reducing any artificial peaks or troughs in the histogram data caused by the histogram analysis.

Embodiments of the invention recognise that the two images captured by a 3D camera arrangement are almost but not quite identical, so in embodiments of the invention the color property detector is arranged to detect color properties in respect of a sub-area of each of the pair of corresponding images—for example, a central area of each image can be used, as that central area is more likely to be found in the other of the two images. In embodiments of the invention, the respective sub-areas of the pair of images are displaced with respect to one another so as to represent substantially the same features of the scene.

The color property detection and balancing process described above can be carried out on "live" video, that is to say, on successive image pairs, where the term "live" may refer to processing the successive images as they are captured, or as they are replayed. In embodiments of the invention, however, the apparatus comprises an image store for storing the pair of images, so that the color balancing operation can be carried out on a specific pair of images, and the resulting color property adjustment settings can then be used on subsequent live video.

In embodiments of the invention the apparatus is operable to carry out one or more trials of different color property adjustment parameters, in order to seek a set of parameters which results in a difference in color properties less than a threshold amount.

In embodiments of the invention the color property adjuster is operable to adjust one or more parameters from the list consisting of: gamma; knee; black level; and white level. In a situation where all four such parameters are used, in order to reduce the number of permutations of parameters to be tested, the color property adjuster may be arranged to derive the white level and black level parameters from the gamma and knee parameters.

Although the color properties of both images could be automatically adjusted so as to reduce differences between them, this could mean that neither image has a set of color properties actually desired by the operator of the camera arrangement. In embodiments of the invention, therefore, images from one of the image capturing devices are master images, and images from the other of the image capturing devices are slave images; and that the color property adjuster is arranged to alter the color properties of the slave images so that the color properties of the slave images correspond more closely to those of the master images. To allow for user adjustment of the color properties of the master images, the apparatus may comprise a user control for user adjustment of the color properties of the master images.

The invention also provides a camera system comprising a pair of image capturing devices arranged with respect to one another so as to capture images representing different respective views of a scene; and image adjustment apparatus as defined above. In embodiments of the invention the image capturing devices are video cameras, which may be laterally displaced from one another, substantially in a horizontal image direction, so as to generate respective three-dimensional image pairs.

Further respective aspects and features of the invention are defined in the appended claims. Features of one aspect of the invention (for example an apparatus) are equally applicable to other aspects of the invention (for example a method).

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
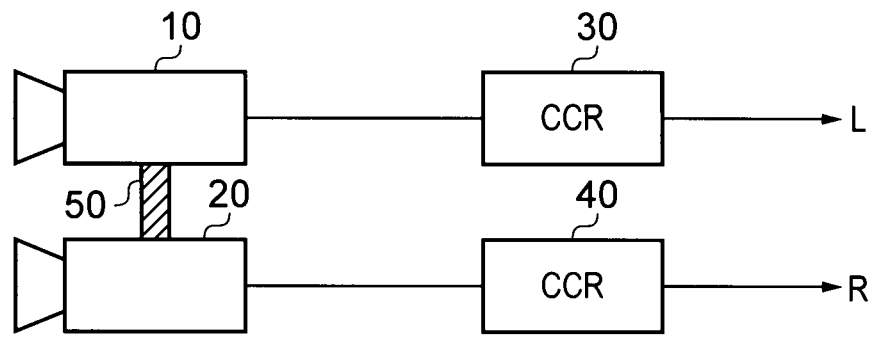
FIG. 1 schematically illustrates a 3D camera arrangement with manual color correction.

Referring now to the drawings, for comparison with the prior art, FIG. 1 schematically illustrates a conventional 3D camera arrangement with manual color correction, or color property adjustment.

In FIG. 1, two video cameras 10, 20 are provided. Video signals from each camera are supplied to a respective color corrector (CCR) 30, 40 for manual color property adjustment. The adjusted video signals represent left (L) and right (R) video signals of a 3D video signal.

In order to provide 3D operation, the cameras 10, 20 are held by a mechanism (shown generically in FIG. 1 as a bracket 50) which maintains the cameras a certain distance apart. The separation of the centres of the lens systems of the two cameras could be equal to an average eye separation (for example 8 cm), though other separations can be used for various artistic effects in the final 3D video. The cameras are normally separated laterally, i.e. along a horizontal image direction and, optionally, may be oriented relative to one another so as to converge slightly, the convergence sometimes being referred to as toe-in. The cameras are also synchronised together, in terms of their video capture timing (for example by being supplied with a common video synchronisation signal, not shown) and also in terms of their nominal zoom, focus and exposure settings. The cameras capture images representing different respective views of a scene.

The color correctors 30, 40 use known technology to adjust color properties of the respective images. For example, the color correctors can adjust the following properties in respect of each primary color (for example Red, Green and Blue) of the video signal: white level, black level, gamma and knee. That is to say, the color corrector 30 applies a set of parameters to the red component of the video signal generated by the camera 10, another (potentially different) set of parameters to the green component of the video signal generated by the camera 10, and a third (potentially different again) set of parameters to the blue component of the video signal generated by the camera 10. The color corrector 40 does a similar function, though with potentially entirely different parameters, in respect of components of the video signal generated by the camera 20.

The white level, black level, gamma and knee parameters will be described further below. These are just example parameters, however, and the skilled person will understand that color correctors may operate in different ways to achieve a desired adjustment of the color properties of an image or of a video signal.

Figure 2:
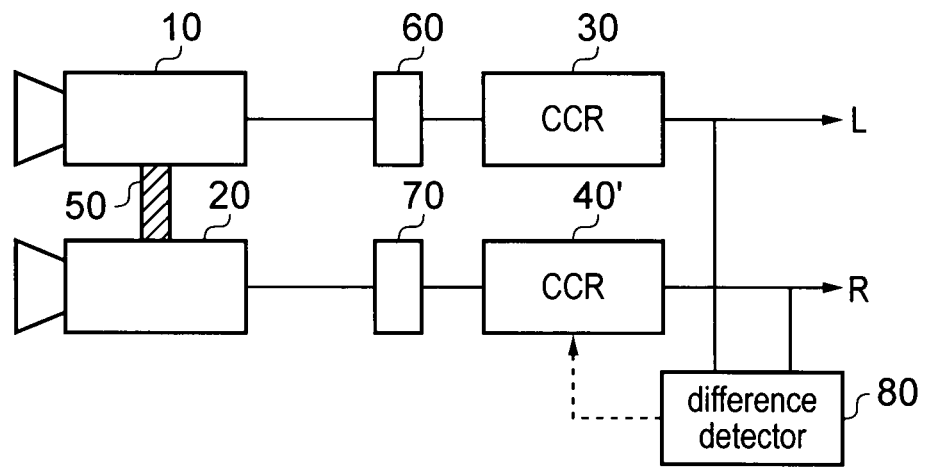
FIG. 2 schematically illustrates a 3D camera arrangement with automatic post-processing correction according to an embodiment of the invention.

FIG. 2 schematically illustrates a 3D camera arrangement with automatic post-processing correction according to an embodiment of the invention. The arrangement of FIG. 2 uses video cameras 10, 20 connected by a bracket 50 in the same way as FIG. 1. The arrangement can be considered as a pair of cameras and an image adjustment apparatus.

The video signals are passed to (optional) respective frame stores 60, 70 (acting together as an image store), before being supplied to the CCR 30 (in the case of the L video signal) and a modified CCR 40' (in the case of the R video signal). The outputs of the two CCRs are passed to a difference detector 80 which controls the operation of the CCR 40'.

An arbitrary one of the video signals (in this example, the L video signal) is treated as a master video signal. It has color properties adjustable by a user with the CCR 30 as in FIG. 1. The user adjusts the master video signal to achieve a desired set of color properties, using a user control (not shown). The other signal is considered as a slave signal. The system adjusts the color properties of the slave signal so as to correspond more closely to those of the master signal.

In order to achieve color property adjustment of the R video signal, the frame stores are enabled (for example under user control or under control of the difference detector 80) so as to act as an image store to freeze the L and R video signals. That is to say, under normal operation the frame stores simply pass the L and R video signals to the CCRs 30, 40', whereas when color property adjustment calibration is to take place the frame stores act so as to store a particular image or frame of the two video signals and supply only that frame to the CCRs until the freeze operation is terminated. This allows the color property adjustment operation to be calibrated on the basis of a constant pair of corresponding images, so that those calibrated parameters can then be applied to subsequent pairs of images. In embodiments of the invention the pair of images which are frozen in the frame stores for the calibration process represents a pair of images captured at the same point in time.

The difference detector 80 detects differences in the color properties of pair of images of the L and R video streams. In particular, the difference detector detects differences in color properties of such images after the images have been processed by a noise adder (see below).

From these detected differences, the difference detector 80 generates color property adjustment parameters to control the operation of the CCR 40', so as to reduce the detected differences either to zero or to within a threshold amount (for example a respective threshold difference for each of a set of color components). This has the effect of reducing actual differences in color properties between the two images. So, the CCR 40', acting as a color property adjuster, is controlled on the basis of the differences detected by the difference detector so as to reduce the differences in color properties between corresponding images captured by the two image capturing devices. The operation of the difference detector will be described further with reference to FIG. 4 below.

Once the calibration process is complete, i.e. the detected differences have been reduced to zero or to within the threshold amount, then the freeze operation of the frame stores 60, 70 can be terminated and the system can return to passing video signals in real time (noting that the frame stores 60, 70 and the CCRs 30, 40' may each introduce a small delay in the signal path, even during real-time operation). In other words, in embodiments of the invention color property adjustments are derived during a calibration phase from a sample pair of images and then, after the adjustments have been derived, the adjustments are applied to subsequent images or pairs of images. The calibration phase can be initiated by the user, or can be initiated in response to the apparatus being powered up or rebooted, or could take place periodically. If required, the "live" stream of images from the cameras can be arranged to bypass the image adjustment apparatus during the calibration phase.

Figure 3:
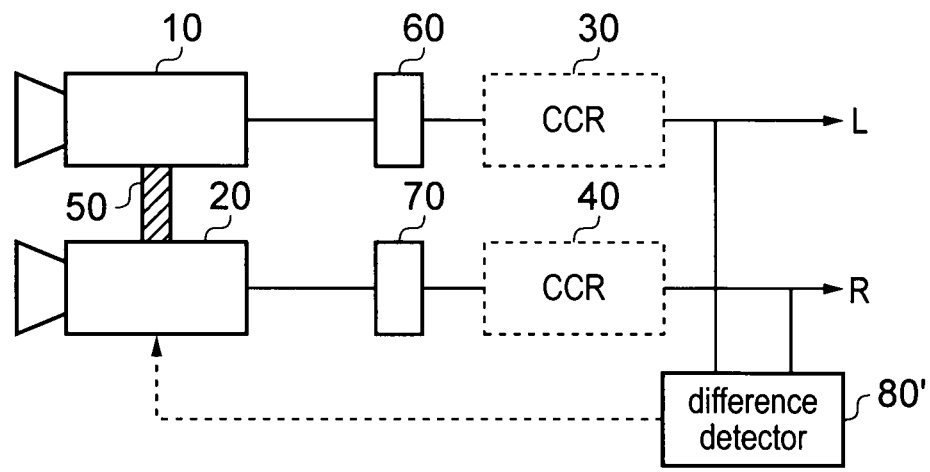
FIG. 3 schematically illustrates a 3D camera arrangement with automatic camera adjustment according to an embodiment of the invention.

FIG. 3 schematically illustrates a 3D camera arrangement with automatic camera adjustment according to an embodiment of the invention. Here, the optional frame stores 60, 70 are provided so that (if required) the images under test can be frozen during the calibration process. The CCRs 30, 40 are also optional. A difference detector 80' acts in a similar way to the difference detector 80 but instead of controlling the operation of the CCR 40', it controls camera control unit (CCU) settings associated with at least one of the cameras 10, 20. In the arrangement shown in FIG. 3, the camera 10 is considered as a master camera having CCU settings (such as white level, black level, gamma and knee) adjustable by the user, and the camera 20 is a slave camera having its CCU settings controlled by the difference detector 80'. Features of the description below of CCR-based embodiments are also applicable to the embodiment of FIG. 3.

Figure 4:
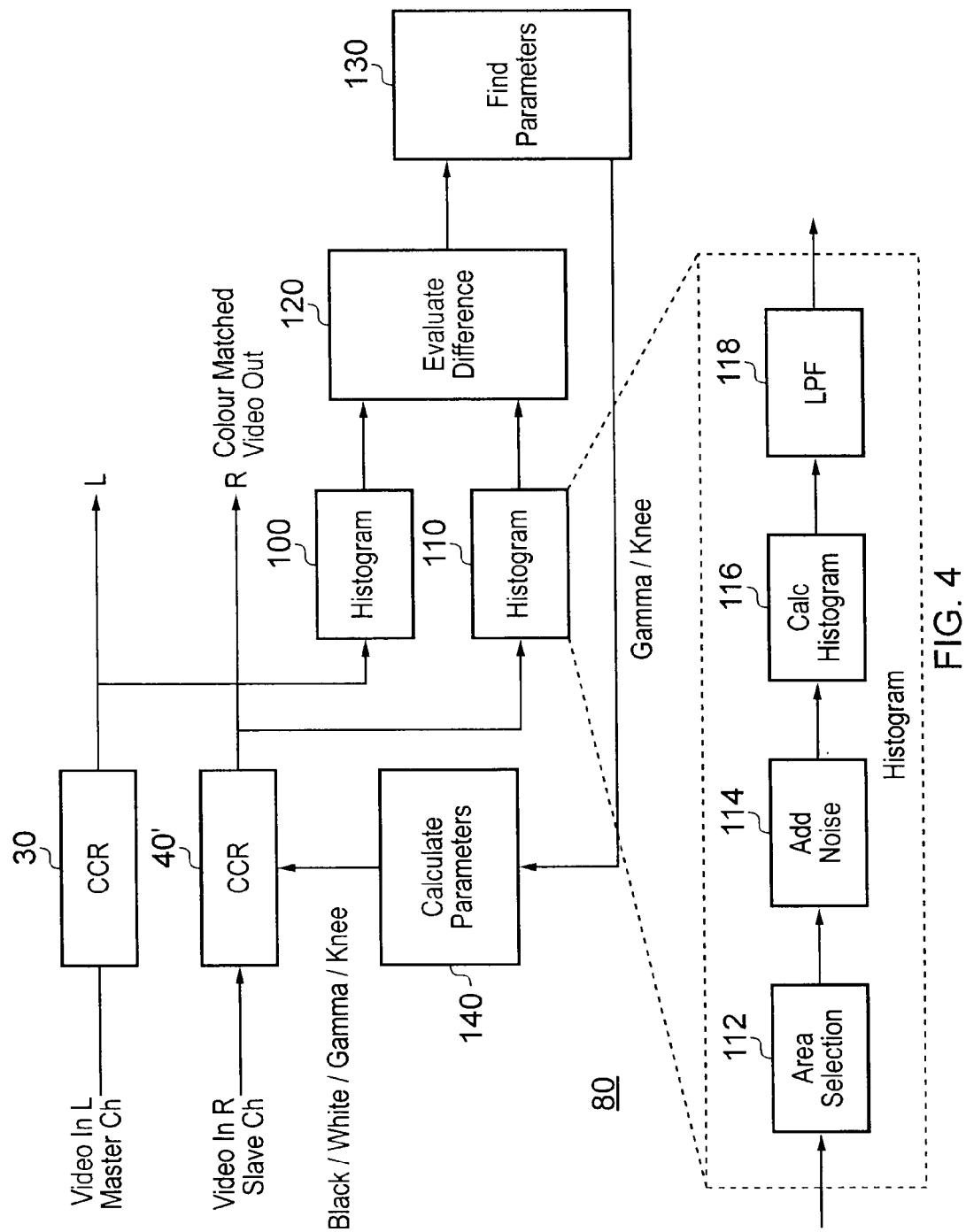
FIG. 4 schematically illustrates an image adjustment apparatus.

FIG. 4 schematically illustrates an image adjustment apparatus, and in particular the difference detector 80 of FIG. 2 and its interaction with the CCRs 30, 40'.

The difference detector 80 comprises a pair of histogram detectors 100, 110 collectively acting as a color property detector, a difference evaluator 120, a parameter finder 130 and a parameter calculator 140.

Figure 5:
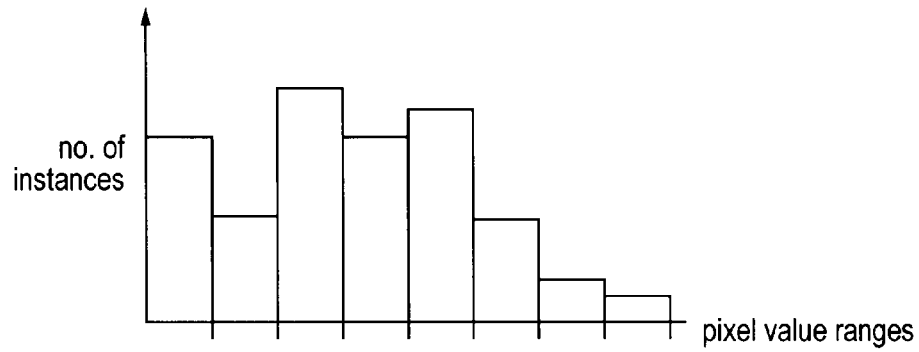
FIG. 5 is a schematic example histogram.

The histogram detectors 100, 110 each act on a respective video stream (L, R) and detect the distribution of pixel brightness values in each of the three primary color (red, green and blue, or R, G and B) streams. Of course, if video formats other than RGB are used, then the histogram detectors could act on the relevant streams of those formats instead. An example histogram is shown in FIG. 5 for one such stream (for example the red stream of the L video channel), and illustrates that pixel values across the image (or a selected part of the image) are allocated to pixel value intervals (bins) and the number of instances of pixels within each such interval is detected. The intervals may encompass more than one possible pixel value, partly to reduce the data processing requirements of the subsequent comparison, and partly to smooth the resulting histogram data so as to reduce the detection of differences where the viewer would not be able to see a difference. The intervals need not be of the same extent within a particular histogram, though in the present example identically sized intervals are used. It is useful, however, that the intervals used in each pair of histograms for comparison (for example the red histogram of the L channel and the red histogram of the R channel) are the same. In the present example, 256 equally spaced intervals are used, so in the case of 10-bit (1024 possible values) per color video, each interval encompasses 4 possible pixel values.

In order to detect the histograms, each histogram detector 100, 110 comprises an area selector 112, a noise adder 114, a histogram calculator 116 and a low pass filter 118.

The area selector 112 operates to select an area (such as a sub-area) of the image over which the histogram is to be calculated. This may be a central area, representing a sub-portion of the whole image area (useful for two reasons: because the edges of a stereo pair of images will often be different and also to reduce the processing requirement), and the areas may be offset or displaced laterally (that is, in a horizontal image direction) so as generally to encompass the same parts of the scene or, in other words, so as generally to represent substantially the same features of the scene. The amount of the offset can be set in advance as a value (for example 20 pixels) which will tend to result in corresponding parts of the scene falling within the two selected areas. Or the offset can be derived by an image matching process which identifies corresponding image features. Or the offset can be derived using a function of the cameras' current zoom and/or focus and/or convergence (toe-in) parameters. Note that the selected areas are used for the purpose of detecting differences, but any color property adjustments derived from those detected differences are, in embodiments of the invention, applied to the whole of the respective image. That is to say, the color property adjustments derived from the detected differences across the selected areas act as a seed for color correction of whole images.

Noise is then added to the selected areas of one or both images by the noise adder 114. The noise signal that is added can be random, pseudo-random or other types, and is added to the pixel values in each of the red, green and blue streams, for example either (a) with an average (for example a root mean square) amplitude of 1 (in the pixel value scale), or (b) with an amplitude which is related to the size of the histogram intervals—for example one half of the interval size. The intention behind adding the noise is to avoid the situation that pixels which appear very similar or identical to the viewer (for example pixels separated by one in the pixel value scale) fall into different histogram intervals and so lead to the generation of correction parameters which would otherwise be unnecessary. Adding the noise signal means that such pixels adjacent to the boundary of two intervals will be randomly placed into intervals either side of the boundary. Adding a noise signal would be useful in other color property detection arrangements as well, so as to avoid or reduce the incidence or effect of artificial differences caused by pixels that are very nearly the same falling either side of any detection thresholds or the like.

If noise is added to only one of the images, then the other image is still output by the noise adder, just unchanged. However, in embodiments of the invention, noise is added to both images.

The histogram is then calculated by the histogram calculator 116 in a conventional way, using the defined intervals.

Finally, the low pass filter 118 applies a smoothing to the histogram so as to tend to reduce large variations between the detected numbers of instances in adjacent intervals. This is done for the same reason as the noise was added by the noise adder 114, to avoid (or reduce the amount of) correction being applied for artificial effects caused by pixels falling just to one side or the other of an interval boundary.

Accordingly, in embodiments of the invention, the process of histogram generation comprises processing by the noise adder (noise combiner) on one or both of the pair of corresponding captured images, possibly in a selected sub-area of each image, followed by the histogram calculator acting as a color property detector to detect color properties representing the distribution of pixel brightness in each of a set of primary colors with respect to a set of brightness intervals, at least some of the intervals encompassing more than one possible pixel brightness level, followed by a low pass filter smoothing the histograms prior to the detection of differences between the histograms. Not all of these processes need be applied.

Figure 6:
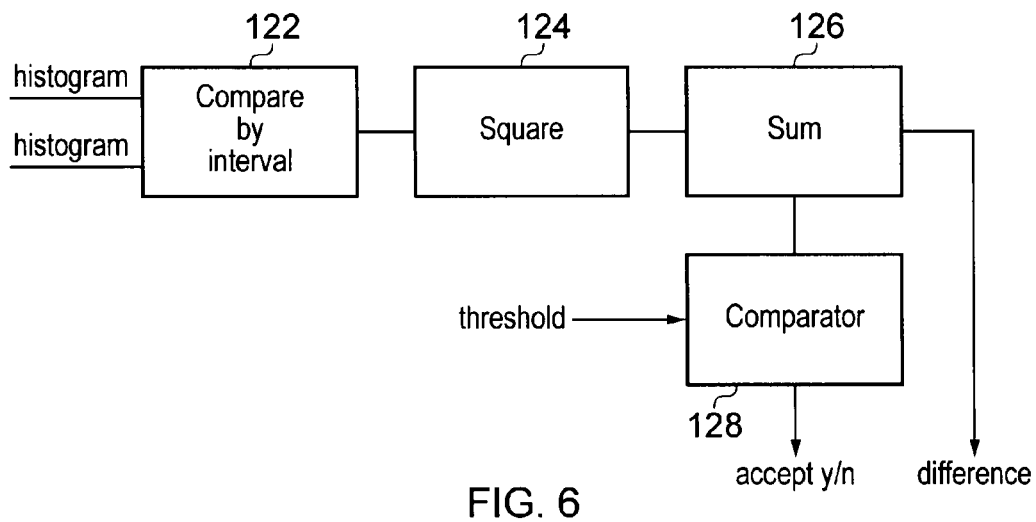
FIG. 6 schematically illustrates the operation of a difference evaluator.

FIG. 6 schematically illustrates the operation of the difference evaluator 120. This operation comprises comparing the two histograms (in respect of the same color stream, one from each of the L & R channels) on an interval-by-interval basis 122, squaring the differences obtained for each interval 124, and summing the squares 126. This generates a single difference value in respect of that color component stream. The single difference value may then be output or stored (if the system is searching for the lowest such difference—see below) or may be compared 128 with a threshold value (if the system is seeking the first set of parameters to arrive at a difference below the threshold value).

Figure 7:
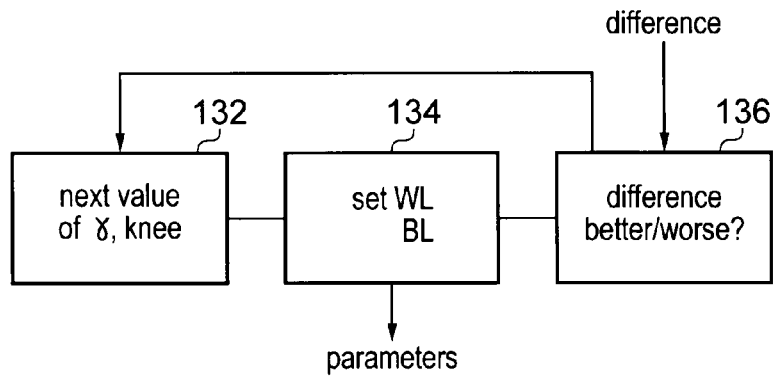
FIG. 7 schematically illustrates the operation of a parameter finder and parameter calculator.

FIG. 7 schematically illustrates the operation of the parameter finder 130 and the parameter calculator 140. This arrangement operates to carry out one or more trials of different color property adjustment parameters, in order to seek a set of parameters which results in a difference in color properties (or at least, detected color properties) of less than a threshold amount.

With reference to the parameter search strategy set out in the description of FIG. 9 below, the parameter finder identifies (132) the next value of the gamma and knee parameters to be tested in accordance with a search strategy to be discussed below. From these, the parameter calculator 140 derives (134) the white and black level parameters in a known manner, and these four parameters are applied to the CCR 40'. Histograms are derived from the output of the CCR 40' and are tested by the apparatus of FIG. 6 to derive a difference value. A test (136) of whether that difference value is better (smaller) or worse (larger) than previously achieved difference values is used to steer the next selection of values (132).

Figure 8:
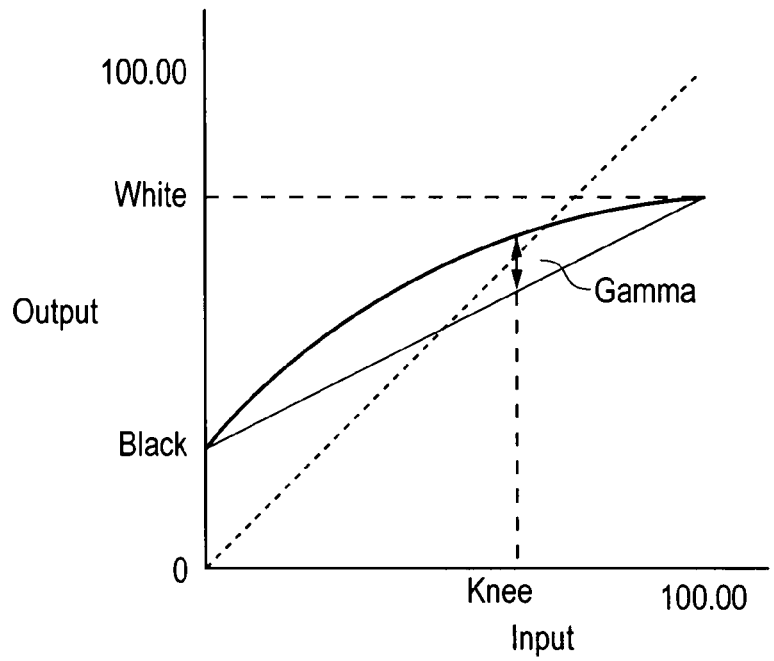
FIG. 8 schematically illustrates the knee, gamma, black level and white level parameters.

FIG. 8 schematically illustrates the knee, gamma, black level and white level parameters, in terms of a mapping function between input pixel value and output pixel value. These are conventional parameters used in CCRs or CCUs. The white level is the highest pixel value amongst the output pixel values (it is referred to as "white" even though the mapping may be applied to individual ones of component streams such as the red, green and blue streams). The black level is the lowest pixel value amongst possible output values. The gamma and knee values define a non-linear relationship between input and output pixel values.

Figure 9:
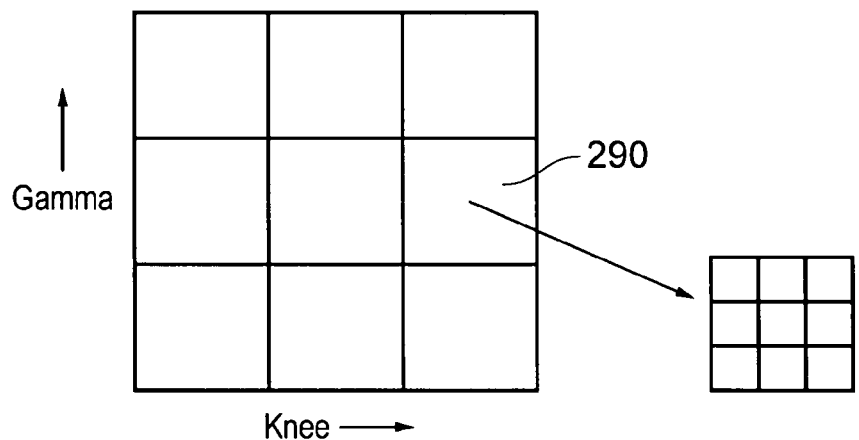
FIG. 9 schematically illustrates a parameter search strategy.

FIG. 9 schematically illustrates a parameter search strategy. The search is a multi-stage search, in that multiple pairs of values of gamma and knee parameters are tested. Note that in the embodiment described above, the white and black levels are derived from the gamma and knee parameters by the parameter calculator 140. This is a routine calculation which will not be described in detail here. In other embodiments, permutations offering the variation of all of the color correction parameters may be tested as part of the search strategy, so avoiding the need to derive some parameters from others in the manner described.

In FIG. 9, a set of nine permutations of gamma and knee parameters are initially tested across the full range of possible gamma and knee parameter values. In a real example, a higher number of permutations would be used; nine are shown just for clarity of the diagram. From these initial tests, a pair of parameters 290 giving the lowest difference (as detected by the difference evaluator 120) is selected, and (as shown on the right hand side of FIG. 9) a finer resolution set of parameter pairs is tested around the selected pair 290. This process can be repeated (if desired or if necessary) so as to arrive at the parameter pair giving the lowest difference from amongst the pairs tested.

The step of finding the "next" parameter set in a search strategy can involve, for example:

(a) simply choosing an untested parameter set from the permutations defined by the search strategy, until all parameter sets have been tested; or (b) detecting whether a previous increase or decrease of a parameter made the outcome worse or better; if better, then implement a further change in that parameter of the same sense (increase or decrease) as the previous change. If worse, implement a further change of the opposite sense. In both cases this is subject to further permutations being available, within the search strategy, with the required increase or decrease. In embodiments of the invention, only one parameter of the set of parameters is changed from test to test.

As an alternative, the search can operate amongst parameters within a predetermined range (or a range selected by the operator) of the parameters in use by the CCR 30, or the search can operate in terms of offsets above and below the respective parameters currently in use by the CCR 30.

The search could stop when the first set of parameters that achieves a difference below the threshold is achieved, or the search could seek the lowest difference even where there are several parameter pairs that achieve a difference below the threshold.

It is noted that the color component streams (for example red, green and blue) each have a respective parameter search.

The arrangement described above operates with respect to images which are newly captured by respective video cameras. However, the images could be recorded and then replayed for color correction of the type described above.

Figure 10:
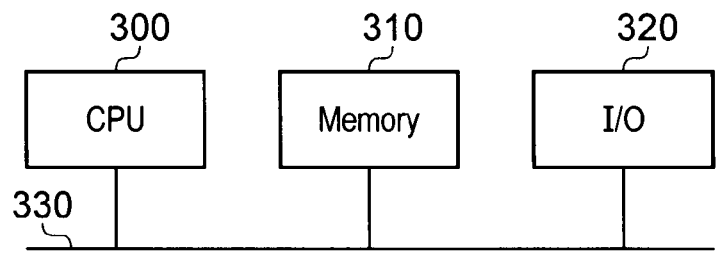
FIG. 10 schematically illustrates a data processing apparatus.

The system described above could be implemented in hardware, programmable or custom hardware (such as application specific integrated circuit(s) or field programmable gate arrays, and/or a data processing apparatus operating under software control. FIG. 10 schematically illustrates such a data processing apparatus comprising a processor (CPU) 300, memory such as program memory and data memory 310, and input/output device(s) 320, all interconnected by a bus arrangement 330. Suitable software is supplied as a computer program product via a non-transitory storage medium such as an optical disc (not shown) and/or via a network or internet connection (not shown). It will be appreciated that in the case of embodiments implemented using software, the software itself, the computer program product and the medium by which the software is supplied should be regarded as embodiments of the invention.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An image adjustment apparatus for processing images output by two image capturing devices arranged with respect to one another so as to capture images representing different respective views of a scene; the image adjustment apparatus comprising:

a noise combiner for combining a noise signal with one or both of a pair of corresponding images captured by the two image capturing devices;

a difference detector for detecting differences in color properties between the pair of corresponding images output by the noise combiner; and a color property adjuster for adjusting color properties of images from at least one of the image capturing devices on the basis of the differences detected by the difference detector, so as to reduce the differences in color properties between corresponding images captured by the two image capturing devices.

2. Apparatus according to claim 1, in which the difference detector comprises:

a color property detector arranged to detect color properties of images output by the noise combiner;

and in which the color properties detected by the color property detector represent the distribution of pixel brightness in each of a set of primary pixel colors.

3. Apparatus according to claim 2, in which the color properties detected by the color property detector comprise, for each of the set of component pixel colors, a histogram of pixel brightness in that color with respect to a set of brightness intervals.

4. Apparatus according to claim 3, in which at least some of the intervals encompass more than one possible pixel brightness value.

5. Apparatus according to claim 3, comprising a low pass filter for smoothing the histograms generated in respect of the pair of images prior to the detection of differences between the histograms.

6. Apparatus according to claim 1, in which the color property detector is arranged to detect color properties in respect of a sub-area of each of the pair of corresponding images.

7. Apparatus according to claim 6, in which the respective sub-areas of the pair of images are displaced with respect to one another so as to represent substantially the same features of the scene.

8. Apparatus according to claim 1, comprising an image store for storing the pair of images.

9. Apparatus according to claim 1, in which the apparatus is operable to carry out one or more trials of different color property adjustment parameters, in order to seek a set of parameters which results in a difference in color properties less than a threshold amount.

10. Apparatus according to claim 1, in which the color property adjuster is operable to adjust one or more parameters from the list consisting of:

gamma;

knee;

black level; and white level.

11. Apparatus according to claim 10, in which the color property adjuster is arranged to derive the white level and black level parameters from the gamma and knee parameters.

12. Apparatus according to claim 1, in which:

images from one of the image capturing devices are master images, and images from the other of the image capturing devices are slave images;

the color property adjuster is arranged to alter the color properties of the slave images so that the color properties of the slave images correspond more closely to those of the master images.

13. Apparatus according to claim 12, comprising a user control for user adjustment of the color properties of the master images.

14. A camera system comprising:

a pair of image capturing devices arranged with respect to one another so as to capture images representing different respective views of a scene; and image adjustment apparatus according to any one of the preceding claims.

15. A camera system according to claim 14, in which the image capturing devices are laterally displaced from one another, substantially in a horizontal image direction, so as to generate respective three-dimensional image pairs.

16. A camera system according to claim 14, in which the image capturing devices are video cameras.

17. A method of processing images output by two image capturing devices arranged with respect to one another so as to capture images representing different respective views of a scene; the method comprising the steps of:
- combining a noise signal with one or both of a pair of corresponding images captured by the two image capturing devices;
- detecting differences in color properties between the pair of images output by the combining step; and
- adjusting color properties of images from at least one of the image capturing devices on the basis of the differences detected by the detecting step, so as to reduce the differences in color properties between corresponding images captured by the two image capturing devices.

18. A computer program product comprising a storage medium by which computer software is stored, the computer software being operable, when executed by a computer, to cause the computer to perform the steps of processing images output by two image capturing devices arranged with respect to one another so as to capture images representing different respective views of a scene, by:
- combining a noise signal with one or both of a pair of corresponding images captured by the two image capturing devices;
- detecting differences in color properties between the pair of images output by the combining step; and
- adjusting color properties of images from at least one of the image capturing devices on the basis of the differences detected by the detecting step, so as to reduce the differences in color properties between corresponding images captured by the two image capturing devices.

* * * * *